United States Patent
Huth

(10) Patent No.: US 9,566,947 B2
(45) Date of Patent: Feb. 14, 2017

(54) VEHICLE DISPLAY HAVING A RETRACTABLE SCREEN AND CLEANING DEVICE

(71) Applicant: GM GLOBAL TECHNOLOGY OPERATIONS LLC, Detroit, MI (US)

(72) Inventor: Johannes Huth, Frankfurt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 486 days.

(21) Appl. No.: 14/038,105

(22) Filed: Sep. 26, 2013

(65) Prior Publication Data

US 2014/0082873 A1 Mar. 27, 2014

(30) Foreign Application Priority Data

Sep. 27, 2012 (DE) .................. 10 2012 019 035

(51) Int. Cl.
| B60K 37/02 | (2006.01) |
|---|---|
| G02B 27/01 | (2006.01) |
| B60S 1/04 | (2006.01) |
| B60S 1/48 | (2006.01) |
| B60S 1/56 | (2006.01) |
| G06F 1/16 | (2006.01) |

(52) U.S. Cl.
CPC ............ B60S 1/0411 (2013.01); B60K 37/02 (2013.01); B60S 1/48 (2013.01); B60S 1/566 (2013.01); B60K 2350/1028 (2013.01); B60K 2350/405 (2013.01); G02B 27/01 (2013.01); G02B 2027/0156 (2013.01); G06F 1/1607 (2013.01)

(58) Field of Classification Search
CPC ............ B60S 1/0411; B60S 1/44; B60S 1/46; B60S 1/56; B60S 1/566; B60S 1/524; B60K 37/00; B60K 37/02; B60K 37/04; B60K 35/00; B60K 2350/2052; B60K 2350/1028; B60K 2350/405; G06F 1/1624; G06F 1/1601; G06F 1/1607; H04M 1/0237; H04M 1/0268; G02B 27/01; G02B 27/0149; G02B 2027/0156; G02B 2027/0154
USPC .. 15/250.1, 250.22; 345/9; 340/980; 359/13; 361/679.01, 679.05, 679.06, 361/679.27; 455/575.3, 575.1, 575.9, 899
See application file for complete search history.

(56) References Cited

U.S. PATENT DOCUMENTS

| 3,545,027 A | * | 12/1970 | Rulapaugh ............ B60S 1/0402 |
|---|---|---|---|
| | | | 15/250.04 |
| 4,080,685 A | * | 3/1978 | Vanderpool ............. B60S 1/603 |
| | | | 15/250.002 |
| 5,204,666 A | | 4/1993 | Aoki et al. |
| 8,493,714 B2 | * | 7/2013 | Visser .................... G06F 1/1613 |
| | | | 361/679.01 |
| 2006/0064837 A1 | | 3/2006 | Mayo |

FOREIGN PATENT DOCUMENTS

| DE | 19728563 | * | 2/1999 |
|---|---|---|---|
| DE | 102005025572 A1 | | 6/2006 |
| DE | 202006017665 U1 | | 2/2007 |

(Continued)

*Primary Examiner* — Gary Graham
(74) *Attorney, Agent, or Firm* — Lorenz & Kopf LLP

(57) ABSTRACT

A cleaning device is provided for a window element, which is insertably and retractably provided in a vehicle panel of a vehicle, with a cleaning element designed so as to rotate around its longitudinal axis, and with a feeder device to supply cleaning liquid to the cleaning element for cleaning the window element. A vehicle is also provided with such a cleaning device.

19 Claims, 2 Drawing Sheets

(56) References Cited

FOREIGN PATENT DOCUMENTS

| DE | 102006042595 A1 | | 3/2008 |
|---|---|---|---|
| DE | 102007006096 A1 | | 8/2008 |
| JP | 8-129431 | * | 5/1996 |
| JP | 2003127711 A | | 5/2003 |

* cited by examiner

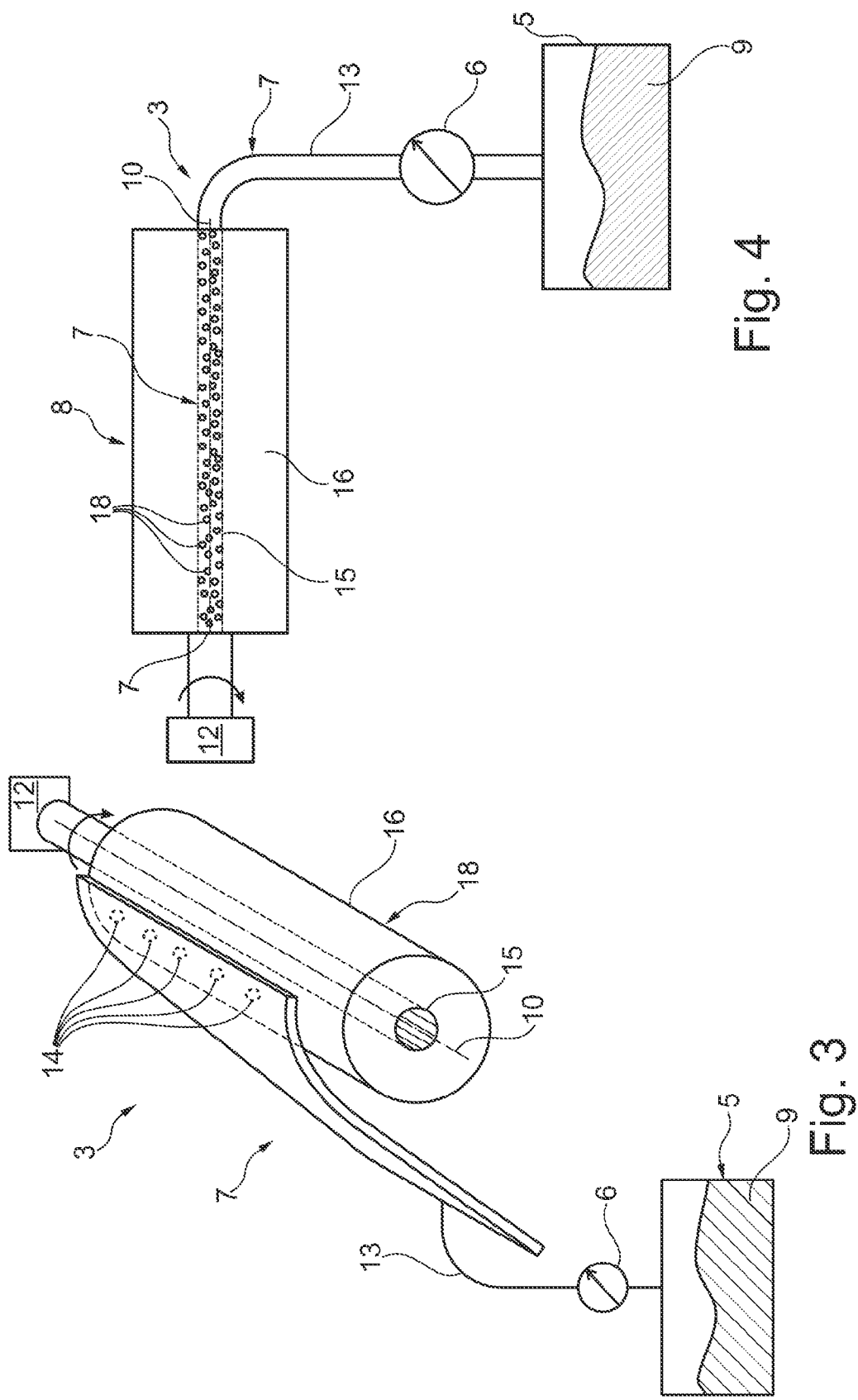

VEHICLE DISPLAY HAVING A RETRACTABLE SCREEN AND CLEANING DEVICE

CROSS-REFERENCE TO RELATED APPLICATION

This application claims priority to German Patent Application No. 10 2012 019 035.2, filed Sep. 27, 2012, which is incorporated herein by reference in its entirety.

TECHNICAL FIELD

The technical field relates to a cleaning device for a window element, which is insertably and retractably provided in a vehicle panel of a vehicle, in particular a motor vehicle, and further relates to a vehicle with such a cleaning device.

BACKGROUND

DE 10 2005 025 572 A1 describes a self-cleaning control and display device, whose surface is coated with nanoparticles. In addition, the self-cleaning control and display unit described therein exhibits a cover arrangement for the control and display unit, which can completely cover the control and display unit, and be removed for actuating the control and display device.

Against this backdrop, at least one object is to enable an improved cleaning of a window or display screen in a vehicle. In addition, other objects, desirable features and characteristics will become apparent from the subsequent summary and detailed description, and the appended claims, taken in conjunction with the accompanying drawings and this background.

SUMMARY

A cleaning device is provided for a window element, which is insertably and retractably provided in a vehicle panel of a vehicle, with a cleaning element designed so as to rotate around its longitudinal axis, and with a feeder device to supply cleaning liquid to the cleaning element for cleaning the window element. A vehicle, in particular a motor vehicle, is also provided with at least one vehicle panel, with at least one window element, which is insertably and retractably provided in the vehicle panel, with at least one cleaning device. The rotating cleaning element makes it possible to effectively wipe off the window element. In addition, a cleaning liquid can in this way be applied, which reliably removes in particular greasy imprints that under certain conditions cannot be eliminated by wiping alone.

In embodiments, the cleaning element is arranged and positioned in such a way as to come into contact with the window element while introducing the window element into the vehicle panel and/or retracting it from the vehicle panel. In this way, the window is advantageously cleaned, as it were, during each actuation. According to another embodiment of the invention, the feeder device exhibits a container for a cleaning liquid, wherein the container can be attached in the vehicle, preferably removably attached. The removable configuration and function of the container allows it to be refilled with cleaning liquid. A rigidly installed container can in turn be provided with a cleaning liquid feed line for replenishing the cleaning liquid.

In another embodiment, the feeder device can be coupled to a container with cleaning liquid. For example, the feeder device is coupled to a container with windshield wiper fluid for the vehicle. This makes it possible to do without an additional container just for the cleaning device. In another embodiment, the cleaning device exhibits a pump for pumping cleaning liquid out of the container into the feeder device. As an alternative, the cleaning device can be coupled to such a pump, e.g., a pump for pumping windshield wiper fluid, when the cleaning device is coupled to a container for windshield wiper fluid.

According to another embodiment, the feeder device is arranged inside and/or outside the cleaning element, and extends in the longitudinal direction of the cleaning element along a partial area of the cleaning element or the entire area of the cleaning element. The feeder device exhibits at least one opening and/or nozzle for applying the cleaning liquid onto the cleaning element, for example from the inside or outside. For example, the cleaning liquid can be applied over a portion or the entire length of the cleaning element.

According to another embodiment, the cleaning element exhibits a cleaner carrier, whose exterior has arranged upon it a cleaner for accommodating the cleaning liquid of the feeder device. For example, the cleaner can be designed as a cleaning sponge, cleaning fabric and/or cleaning fleece. The cleaner carrier is here preferably designed as a tube or rod, which is rotatably coupled with a motor. In a further embodiment, the tube is designed as a feeder device, wherein its wall exhibits a plurality of openings or perforations, and the tube is connected or designed to be connected with a line with the container for the cleaning liquid.

According to another embodiment, the cleaning device comprises a scraping device for scraping excess cleaning agent from the window element. For example, the scraping device can be designed as an elastic rubber lip. The scraper is here preferably movably designed so as to move the scraper device while in or out of contact with the window element. For example, the scraper device can here be coupled to a motor for pivoting the scraper device or moving it back and forth along a straight line. In an embodiment, the cleaning element exhibits a cylindrical shape. The cleaner carrier can here be coupled to the motor for turning the cleaning element.

In a preferred embodiment, the window element is designed as a display screen, in particular as a touch screen with a display screen. For example, the display screen can be an extendible display screen of the navigation system or the driver information system. In addition, a mirror, a sunroof, a panoramic windscreen, an inner separating pane or the like can also be provided as the window. Additionally or alternatively, it can also be provided that the window element is designed as a vehicle pane, in particular as a side window or rear window. The vehicle panel is typically designed as a vehicle console, seat panel and/or door panel.

The above embodiments and further embodiment are combined with each other in any way that makes sense. Additional possible embodiments, further developments and implementations of the invention also encompass not explicitly mentioned combinations of features of the invention described above or below in relation to the exemplary embodiments. In particular, the expert will here add individual aspects as improvements or enhancements to the respective basic framework.

BRIEF DESCRIPTION OF THE DRAWINGS

The present invention will hereinafter be described in conjunction with the following drawing figures, wherein like numerals denote like elements, and:

FIG. 3 is an exemplary embodiment of a cleaning device; and

FIG. 4 is another exemplary embodiment of a cleaning device.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
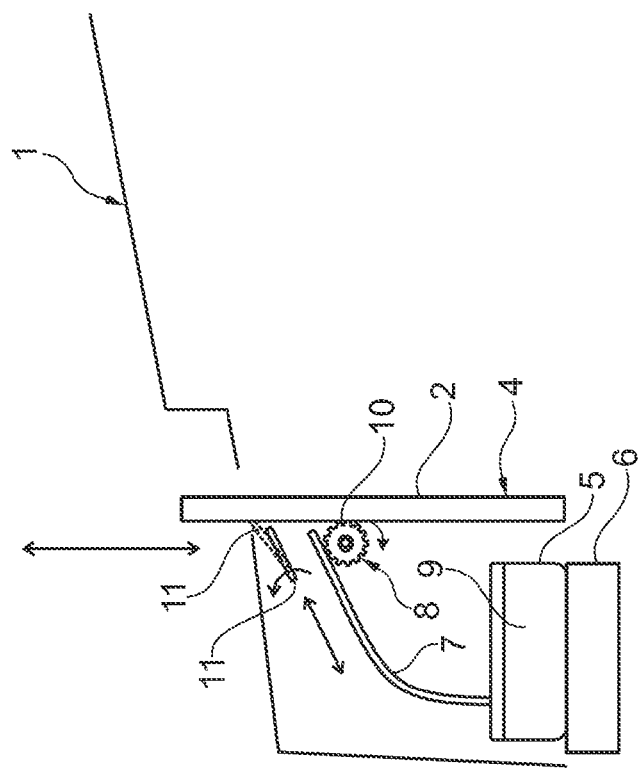
FIG. 1 is a side view of a vehicle console with a window element and its cleaning device according to an embodiment, where the window element is depicted in an extended position.
Figure 2:
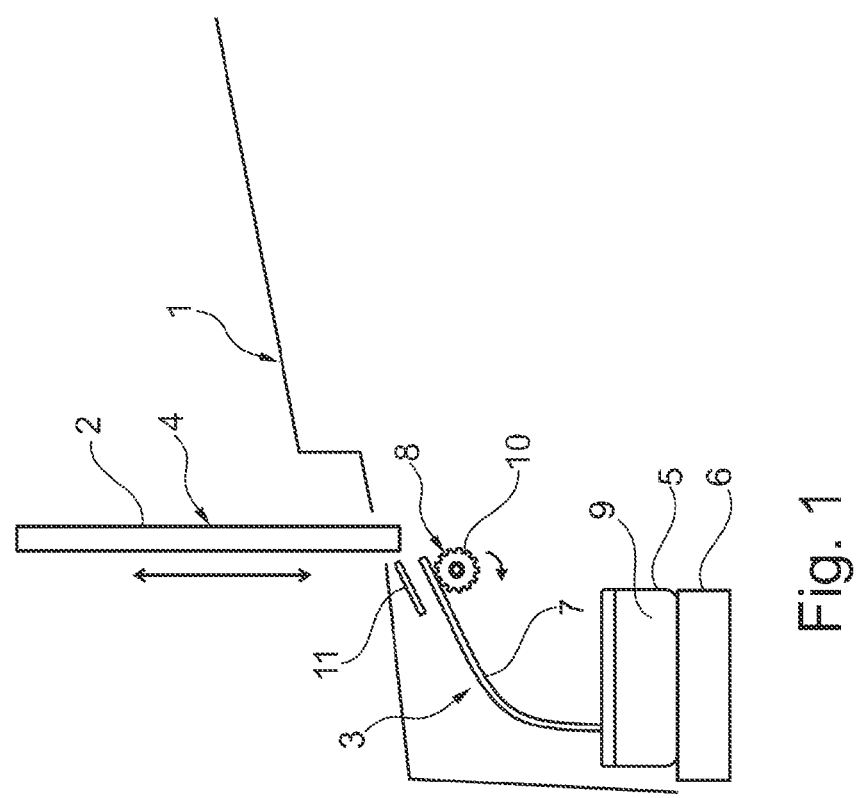
FIG. 2 is a side view of the vehicle console with a window element and its cleaning device according to FIG. 1, where the window element is depicted in a partially retracted position.

FIG. 1 and FIG. 2 present a side view of a vehicle console 1, here for example a vehicle console, with a window element 2 and its cleaning device 3 according to an embodiment. The window element 2 on FIG. 1 is shown in a position or operating position extended from the vehicle console 1. FIG. 2 in turn depicts the window element 2 during retraction into the vehicle console 1, where the window element 2 is cleaned with its cleaning device 3. The window element 2 in the exemplary embodiment shown on FIG. 1 and FIG. 2 is a display screen, e.g., a touch screen 4. In the operating position, the window element 2, e.g., here as part of the touch screen 4, can be actuated by contact, for example, e.g., to activate functions in the vehicle via the touch screen, etc.

The vehicle console 1 can here be a center console, a dashboard, a rear seat panel or a door panel, in which an insertable and retractable window element is provided. The window element 2 provided in the vehicle, e.g., here in the vehicle console 1, can be displaced up and down and back and forth, so as to be extended from and retracted into the vehicle console 1. The cleaning device 3 of the window element 2 here exhibits a cleaning element 8 rotatable around its longitudinal axis, which can be exposed to a cleaning liquid. The cleaning element 8 preferably exhibits a cylindrical shape. The cleaning liquid is held in a container 6, and is fed to the cleaning element 8 from the container 5 by a pump 6 and feeder device 7. The cleaning element 8 is here designed to be exposed to the cleaning liquid 9 in a longitudinal direction in at least a partial area or over the entire area or its entire length, as will be explained in greater detail below based on FIG. 3 and FIG. 4.

For example, the container 5 is here fixedly integrated into, e.g., screwed onto, the vehicle, and exhibits at least one feed line (not shown) for supplying cleaning liquid 9 into the container. A feed line can here be provided in such a way that it is situated in the vehicle console 1 and can be sealed by means of a lid (not shown), or, for example, is connected with the container for the windshield wiper fluid (not shown) to introduce windshield wiper fluid as the cleaning liquid in the container 5, or be arranged in the engine compartment or in the trunk, etc., where it can here additionally be designed so that it can be sealed with a lid. Likewise, the container 5 can additionally or alternatively be removably secured in the vehicle to fill up the container 6 with cleaning liquid 9.

As depicted in the exemplary embodiment on FIG. 1 and FIG. 2, the container 5, feeder device 7 and/or pump 6 can be situated in front of the window element 2, here the display screen of the touch screen 4. In like manner, the container 5, feeder device 7 and/or pump 6 can be arranged under or behind the window element 2 (not shown). The window element 2 is provided in such a way that it can move back and forth along the cleaning element 8, as denoted by an arrow F on FIG. 1 and FIG. 2. As shown on FIG. 2, the window element 2 here comes into contact with the cleaning element 8 in such a way that the cleaning element 8 can clean the window element 2 while moving the window element 2 back and forth along the cleaning element 8.

While cleaning the window element 2, the cleaning element 8 rotates around its longitudinal axis 10. To this end, the cleaning element 8 is coupled with a motor (not shown), for example an electric motor, which rotates the cleaning element 8 around its longitudinal axis 10. The cleaning element 8 can here be designed to rotate with at least one constant speed and/or a variable speed.

The window element 2 is also coupled with a motor (not shown) to move it in and out of the vehicle console 1, where the motor is here also an electric motor, for example. Likewise, the window element 2, if it is a side window of the vehicle, can be manually retracted and extended in addition to electrically retracted and extended, for example by means of a window crank.

An additional scraping device 11 can optionally be provided, for example a rubber lip or plastic lip, for scraping away any excess cleaning agent or cleaning liquid, as shown in the exemplary embodiment on FIG. 1. The scraping device 11 can here also be movable in design, in particular when it is not elastic or flexible, but rather fixed or rigid. The scraping device 11 can here be designed to move in such a way that it can be brought into contact with the window element 2 to scrape away excess cleaning agent when again extending the window element 2 out of the vehicle console following insertion and cleaning, and be made not to contact the window element 2 when introducing the window element 2 into the vehicle console for cleaning purposes. The scraping device 11 can here be coupled with a motor (not shown) so as to be displaced back and forth along a straight line, as denoted by a double arrow on FIG. 2, and/or pivot the scraping device 11 toward the window element 2 and away from the window element 2, as denoted by the single arrow on FIG. 2.

On FIG. 2, the scraping device 11 is here marked with a dotted line if it has been displaced or pivoted so as to contact the window element 2 for scraping away any excess cleaning liquid when extending the window element 2 out of the vehicle console 1. FIG. 3 presents an exemplary embodiment for a cleaning device 3.

The cleaning device 3 exhibits a cylindrical cleaning element 8, which is coupled with a motor 12, e.g., an electric motor, so as to turn the cleaning element 8 around its longitudinal axis 10. In addition, the cleaning device 3 exhibits a container 5 with cleaning liquid 9. The cleaning liquid 9 is supplied to the cleaning element 8 from the container 5 by way of a pump 6 and feeder device 7. For example, the feeder device 7 exhibits a line, or is connected with a line 13, as shown in the exemplary embodiment on FIG. 3, which joins the container 5 with the feeder device 7 to feed cleaning liquid 9 into the feeder device 7. A pump 6 here pumps the cleaning liquid 9 out of the container 5 through the line 13 into the feeder device 7, and the latter dispenses the cleaning liquid 9 to the cleaning element 8.

The feeder device 7 is designed in such a way as to extend over at least a partial area in the longitudinal direction of the cleaning element 8, preferably over the entire length of the cleaning element 8, as depicted in the exemplary embodiment on FIG. 3. For example, the feeder device 7 is here situated above the cleaning element 8, and arranged in such a way as to contact the cleaning element 8 or be spaced apart from it, so that a gap exists between the feeder device 7 and cleaning element 8. For example, the bottom side of the feeder device 7 exhibits several nozzles or openings 14 along its length for dispensing cleaning liquid 9. The cleaning liquid 9 here flows through the openings 14 and onto the cleaning element 8 lying under it in the exemplary embodiment on FIG. 3. The openings 14 are here denoted by a dotted line in the exemplary embodiment on FIG. 3. Likewise, the feeder device 7 can also be provided under and/or to the side of the cleaning element 8, and the cleaning liquid 9 can be sputtered or sprayed onto the cleaning element 8 through correspondingly arranged nozzles or openings that preferably lie opposite the cleaning element 8. For example, the cleaning element 8 can exhibit a rod or tube as a cleaner carrier 15, whose exterior side has applied to it a cleaner 16, for example a cleaning sponge, cleaning fabric and/or cleaning fleece, etc., which is moistened or saturated with the cleaning liquid 9, and wipes and cleans off the window element. The cleaner carrier 15, e.g., the rod or tube in this case, is here coupled with the motor 12 to rotate the cleaner carrier 15, here the rod or tube, and the cleaner 16 connected thereto.

FIG. 4 presents another exemplary embodiment of a cleaning device 3. The cleaning device 3 also exhibits a cylindrical cleaning element 8, which is coupled with a motor 12, e.g., an electric motor, for rotating the cleaning element 8 around its longitudinal axis 10. The cleaning device 3 also exhibits a container 5 with cleaning liquid 9. The cleaning liquid 9 is supplied from the container 5 to the cleaning element 8 by way of a pump 6, a line 13 and a feeder device 7. For example, the line 13 is here part of the feeder device 7, as denoted in the exemplary embodiment on FIG. 4, or can be connected with the feeder device 7 to link the container 5 with the cleaning liquid 9 and the feeder device 7. The feeder device 7 moves the cleaning liquid 9 removed from the container 5 onto the cleaning element 8. The pump 6 pumps the cleaning liquid 9 out of the container 5 to the feeder device 7 via the line 13. The feeder device 7 then dispenses the cleaning liquid 9 onto the cleaning element 8.

As a cleaner carrier 15 and concurrently a feeder device 7, the cleaning element 8 exhibits a perforated tube or a tubular lattice or grid, whose exterior side has applied to it a cleaner 16, for example a cleaning sponge, a cleaning fabric and/or a cleaning fleece, etc., which is moistened or saturated with the cleaning liquid 9, and wipes and cleans off the window element. The cleaner carrier 15, for example the perforated tube or tubular lattice or grid in this case, is here coupled with the motor 12 to rotate the cleaner carrier 15 and the cleaner 16 connected thereto.

The cleaner carrier 15 is here coupled as an additional feeder device 7 to the container 5 with the cleaning liquid 9 via the line 13. The cleaning liquid 9 in the feeder device 7, here the perforated tube depicted on FIG. 4, penetrates through the openings 18 in the feeder device 7 out into the cleaner 16. The outer end 17 of the feeder device 7 is here optionally also closed, so that the cleaning agent can only pass radially through the openings 18 in the feeder device 7 into the cleaner 16 of the cleaning element 8. The cleaning liquid passes through the perforations or openings 18 in the feeder device 7, here the tube, outwardly exits the feeder device 7 and gets into the cleaner 16, for example a cleaning sponge. The cleaner 16 saturated with cleaning liquid 9 in this way can clean a window element moving alongside it.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A vehicle display comprising:
   a display screen configured to be positioned between a stowed position in a console of a motor vehicle and a display position out of the console; and
   a cleaning device having a rotating element configured to contact the display screen when the display screen is moved between the stowed position and the display position, and a feeder device configured to supply a cleaning liquid to the cleaning element for cleaning the display screen.

2. The vehicle display according to claim 1:
   wherein the feeder device comprises a container that is configured to hold the cleaning liquid, and
   wherein the container is movably attached in the vehicle.

3. The vehicle display according to claim 1, wherein the feeder device is coupled to a container with the cleaning liquid for the vehicle.

4. The vehicle display according to claim 3, wherein the cleaning device comprises a pump that is configured to pump the cleaning liquid out of the container into the feeder device.

5. The vehicle display according to claim 1:
   wherein the feeder device is arranged outside the cleaning element and extends in a longitudinal direction of the cleaning element along a partial area of the cleaning element,
   wherein the feeder device comprises an opening that is configured to apply the cleaning liquid onto the cleaning element.

6. The vehicle display according to claim 1, wherein the cleaning element comprises a cleaner carrier with an exterior and a cleaner arranged on the exterior for accommodating the cleaning liquid of the feeder device.

7. The vehicle display according to claim 6, wherein the cleaner carrier is a tube that is rotatably coupled with a motor.

8. The vehicle display according to claim 7,
   wherein the tube is the feeder device,
   wherein a wall of the feeder device comprises a plurality of openings, and
   wherein the tube is connected with a line with a container for the cleaning liquid.

9. The vehicle display according to claim 6, wherein the cleaner carrier is a rod that is rotatably coupled with a motor.

10. The vehicle display according to claim 1, wherein the cleaning device comprises a scraping device that is configured to scrape excess cleaning liquid from the display screen.

11. The vehicle display according to claim 10,
   wherein the scraping device is configured to move into contact with the display screen,
   wherein the scraping device is coupled to a motor, and wherein the scraping device is configured to pivot into contact with the display screen.

12. The vehicle display according to claim 11, wherein the cleaning element comprises a cylindrical shape and a cleaner carrier is coupled to the motor that is configured to turn the cleaning element.

13. The vehicle display according to claim 1, wherein the display screen is a touch screen.

14. The vehicle display according to claim 1, wherein the cleaning element is arranged to come into contact with the display screen while retracting the display screen into the console.

15. The vehicle display according to claim 1, wherein the feeder device is coupled to a container with windshield wiper fluid for the vehicle.

16. The vehicle display according to claim 1 further comprising a console formed in an interior of the motor vehicle and supporting the display screen for movement between the stowed position and the display position, wherein the cleaning element is arranged to come into contact with the display screen as it is retracted into the console.

17. The vehicle display according to claim 1, further comprising a scraping device positionable with respect to the display screen between a first position where the scraping device is spaced from the display screen and a second position where the scraping device is in contact with the display screen for removing excess cleaning liquid from the display screen.

18. A vehicle display comprising:
   a console formed in an interior of the motor vehicle;
   a display screen supported in the console for movement between a stowed position in a console and a display position out of the console; and
   a cleaning device having a cylindrical cleaning element configured to contact the display screen when it is moved between the stowed position and the display position; a motor operable to rotate the cylindrical cleaning element relative to the display screen, a feeder device configured to supply a cleaning liquid to the cleaning element for cleaning the display screen, and a scraping device positionable with respect to the display screen between a first position where the scraping device is spaced from the display screen and a second position where the scraping device is in contact with the display screen for removing excess cleaning liquid from the display screen.

19. The vehicle display according to claim 18, wherein the scraping device is coupled to a motor and operably to pivot into contact with the display screen as the motor rotates the cylindrical cleaning element.

* * * * *